No. 895,377. PATENTED AUG. 4, 1908.
J. KUNZ.
DELIVERY APPARATUS FOR DRY GOODS.
APPLICATION FILED MAR. 19, 1908.

Witnesses:
F. R. Pitton.

Inventor:
Jacob Kunz

No. 895,377. PATENTED AUG. 4, 1908.
J. KUNZ.
DELIVERY APPARATUS FOR DRY GOODS.
APPLICATION FILED MAR. 19, 1908.
2 SHEETS—SHEET 2.
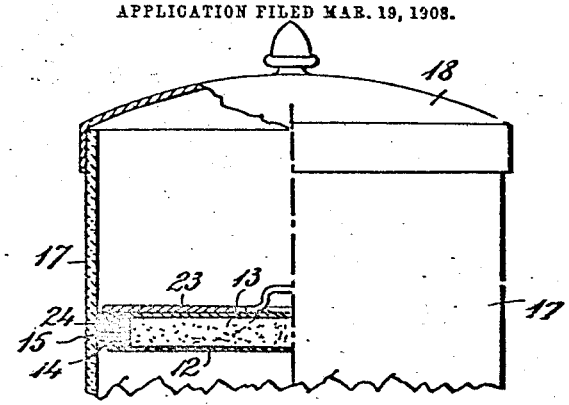
Fig. 2.
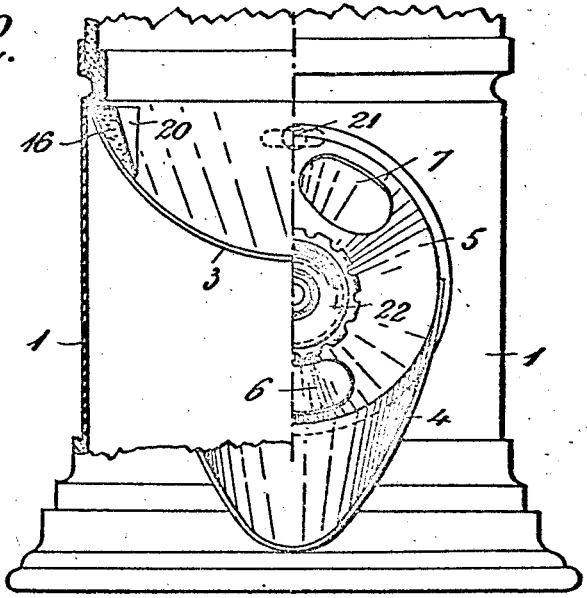
Fig. 3.
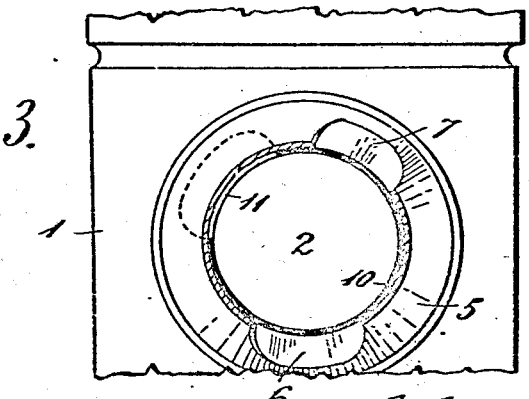
Inventor
Jacob Kunz

UNITED STATES PATENT OFFICE.

JACOB KUNZ, OF VIENNA, AUSTRIA-HUNGARY.

DELIVERY APPARATUS FOR DRY GOODS.

No. 895,377.      Specification of Letters Patent.      Patented Aug. 4, 1908.

Application filed March 19, 1908. Serial No. 422,164.

*To all whom it may concern:*

Be it known that I, JACOB KUNZ, a subject of the Emperor of Germany, residing at Vienna, Empire of Austria-Hungary, have invented certain new and useful Improvements in Delivery Apparatus for Dry Goods; and I do hereby declare the following to be a full, clear, and exact description of the invention, such as will enable others skilled in the art to which it appertains to make and use the same.

My invention relates to delivery apparatus for granular goods.

The object of my invention is to so construct such apparatus that any of the goods delivered in excess of what was required may be returned into the receptacle.

A further object of my invention is to prevent the sticking together of the several particles or pieces of the goods, which would interfere with the free delivery, by providing in the cylindrical receptacle a cover plate lying loosely on the surface of the goods and freely movable in, but fitting as snugly as possible the receptacle. This cover plate is hollow, and perforated at the bottom and is filled with some hygroscopic substance, preferably unslaked lime. This cover plate descends as the receptacle is emptied and thus permanently shuts off the goods from the atmosphere. The hygroscopic substance in the cover plate absorbs any moisture that may enter the receptacle during delivery so that the goods are kept dry. For increasing the effect I provide chambers at the side or sides of the inclined bottom of the receptacle, such chambers being filled with some suitable hygroscopic substance and having openings leading into the receptacle and closed by perforated sheet metal, wire gauze or the like. The hygroscopic substance contained in this chamber or chambers also contributes to the absorption of any moisture entering this receptacle.

In the accompanying drawing one constructional form of my apparatus is shown by way of example.

Figure 1 is a side elevation and partly a central vertical section of my apparatus. Fig. 2 is a section on the line A B, Fig. 1 looking in the direction of the arrow part of this figure being a front elevation. Fig. 3 is a section on the line C D Fig. 1 looking in the direction of the arrow y and Fig. 4 is a section on the line E F, Fig. 1.

The apparatus consists of receptacle 1 preferably cylindrical having in its wall a delivery opening and an inclined bottom 3 running to the bottom edge of the opening 2. This inclined bottom extends to the outside of the receptacle in the form of a short chute 4. A cone 5 projecting outwards is fixed to the edges of the opening 2 and is provided with a hole 6 at the bottom and a hole 7 near its upper side and is closed at its outer end by a plate 8 secured to or integral with the cone. Within this outer cone 5 there is provided an inner cone 10 closely fitting and adapted to rotate within the outer cone. This inner cone is open towards the receptacle and has attached to its outer end a bolt 9 passing through the plate 8 of the outer cone and carrying a handle 22 and a nut on its outer end by screwing down the nut of the bolt, the cone 10 may be caused to fit the outer cone 5 as tightly as may be required, the former being still revoluble in the latter, whereby dust or moisture are prevented from entering between the two cones. The inner cone 10 has on its periphery a hole 11 of approximately the same shape and size as the holes 6 and 7 in the outer cone 5.

The goods, for instance bonbons may be directly filled into the receptacle 1 or a container 17 of glass or other transparent material and having no bottom may be put on the receptacle after having been filled with the goods. The container 17 may be provided with a removable cover 18 or may be permanently closed on top; in the latter case the container 17 after having been filled is reversed and set in position on the receptacle 1.

On top of the goods there lies loosely the cover plate 13, which is hollow and closed on bottom by perforated sheet metal or the like and is filled with a suitable hygroscopic substance preferably unslaked lime. A soft india rubber or other packing ring 15 is attached to the cover plate so that as the receptacle or container is emptied the cover plate descends and shuts off as tightly as possible the goods from the upper part of the receptacle or container. On top of the cover plate 13 which is U-shaped in transverse section and carries at its lower side a flange 14 supporting the packing 15 there is secured another plate 23 fitting snugly the walls of the container and the annular space between the plates 13 and 23 is filled with some suitable material 24 so that even when the cover plate has descended down the transparent container 17 to the opaque receptacle 1, the contents of the apparatus may be indicated by the color or other characteristics of the said material 24. At the side or sides of the receptacle 1 near the delivery cone 5 there are provided chambers 16 filled with some suitable hygroscopic substance and having their opening or openings located near the opening 2 closed by perforated sheet metal, wire, gauze or the like as shown at 19. Preferably one of the walls 20 of the chambers is so secured to the wall of the receptacle that it may be readily removed for instance by a thumb screw 21.

In order to deliver goods the handle 22 is turned until the hole 11 of the inner cone is in front of the hole 6 in the outer cone whereupon the goods fall on the chute 4 and down the same to the package or the like. If more of the goods has thus run out than was required the inner cone 10 is turned until its hole 11 is in front of the hole 7. The hole 6 in the outer hole is thus closed and the surplus delivered may be returned through the hole 6 into the receptacle.

By the hygroscopic substance in the cover plate and in the cover plate 13 and in the chambers 16 any moisture is absorbed that may be contained in the air entering the apparatus and thus the goods are kept dry and prevented from sticking together. Of course the hygroscopic substance to be used must have no odor and must not be liquid or must not become liquid by absorbing moisture in order that the flavor of the goods may not be impaired thereby; unslaked lime is the hygroscopic substance most suitable for the present purpose.

Claims.

1. In a delivery apparatus for granular goods, the combination of a receptacle having an inclined bottom, an opening at the side thereof near the lowermost point of the bottom a container mounted on top of the receptacle, a cover plate closely fitting the container and adapted to lie on the goods within and to slide vertically in the said container, the said cover plate being hollow and having a perforated bottom and being adapted to be filled with a hygroscopic substance, an outer cone closing the opening in the receptacle and having two holes on its circumference, one of which is located at the lower part of the outer cone, an inner cone snugly fitting the outer cone and having a hole on its circumference of a size and shape similar to those of the holes in the outer cone and means for turning the said inner cone within the outer cone, substantially as and for the purpose described.

2. In a delivery apparatus for granular goods, the combination of a receptacle having an inclined bottom, an opening at the side thereof near the lowermost point of the bottom, a transparent container mounted on top of the receptacle, a cover plate closely fitting the container and adapted to lie on the goods within and to slide vertically in the said container, a ring mounted on said cover plate and adapted to indicate by its characteristics the nature of the goods within the container, the said cover plate being hollow and having a perforated bottom and being adapted to be filled with a hygroscopic substance, an outer cone closing the opening in the receptacle and having two holes on its circumference, one of which is located at the lower part of the outer cone, an inner cone snugly fitting the outer cone and having a hole on its circumference of a size and shape similar to those of the holes in the outer cone and means for turning the said inner cone within the outer cone, substantially as and for the purpose described.

In testimony whereof, I affix my signature, in presence of two witnesses.

JACOB KUNZ

Witnesses:
ARTHUR BAUMANN,
ROBERT W. HEINGARTNER.